United States Patent [19]
Ho et al.

[11] Patent Number: 6,025,799
[45] Date of Patent: Feb. 15, 2000

[54] SHORT RANGE POSITION LOCATING SYSTEM FOR TRANSPONDER

[75] Inventors: Thua Van Ho; Robert Walter Tiernay, both of Mississauga, Canada

[73] Assignee: Mark IV Industries Limited, Mississauga, Canada

[21] Appl. No.: 09/040,251

[22] Filed: Mar. 6, 1998

[51] Int. Cl.⁷ .................................................. H01Q 3/02
[52] U.S. Cl. ........................ 342/374; 342/373; 342/457; 455/20
[58] Field of Search .................... 342/30, 51, 79, 342/81, 373–374, 450, 457; 455/20, 83, 13.3, 277.1

[56] References Cited

U.S. PATENT DOCUMENTS

| | | | |
|---|---|---|---|
| 3,860,928 | 1/1975 | Ehrlich | 343/100 SA |
| 4,257,050 | 3/1981 | Ploussios | 343/854 |
| 4,477,812 | 10/1984 | Frisbee et al. | 343/417 |
| 4,881,078 | 11/1989 | Yamane et al. | 342/155 |
| 5,257,031 | 10/1993 | Scarpetta et al. | 342/374 |
| 5,537,122 | 7/1996 | Eguchi | 342/35 S |
| 5,697,052 | 12/1997 | Treatch | 455/20 |

*Primary Examiner*—Thomas H. Tarcza
*Assistant Examiner*—Dao L. Phan
*Attorney, Agent, or Firm*—Robert L. Westell

[57] ABSTRACT

In order to locate a transponder in a roadway there are first and second antenna arrays at spaced locations. Each array is associated with a switching control which causes the array beam to step through a series of beams. The signal developed in each beam is converted to a digital result. The strongest beam from each array may be determined and the location of the transponder at the intersection of the two strongest beams.

28 Claims, 5 Drawing Sheets

SHORT RANGE POSITION LOCATING SYSTEM FOR TRANSPONDER

FIELD OF THE INVENTION

This invention relates to means and a method of locating in a limited region a transponder or a transponder equipped vehicle, also known as angle of arrival (AOA) determination.

The application does not deal in detail with communication between the vehicle transponder and the roadside reader, that is data handling and communication unit at the roadside.

The transponder to be located is assumed to be of the type which sends a pulse train (also known as a burst) of information. The duration of such pulse train is known so that the determination of location is made from measurements made during such duration. However such pulse train can or may be repeated, hence in some cases, a series of progressively determined positions may be found.

Moreover in the protocol generally used, each pulse train will carry data identifying the transponder, thus this can be used by the locating means to identify the location determined.

Moreover the means for detecting the position from the data transmission, may also forward the data to a data receiver and reader for further processing.

Also under any of the protocols generally used only one transponder in an area may operate, at any time, hence all transponders in a region, but one, will be ignored by the locating means. It is assumed that this is the case with the procedures described herein.

PRIOR ART

Under U.S. Pat. No. 5,227,503 ('503) O'Connor et al, at least two antenna arrays compare the phase between vehicle transponder signals arriving at adjacent array elements to obtain the spatial azimuthal angles of arrival thereat of transponder signals. The results of such comparisons from two or more arrays are continuously supplied to a position calculation processor which provides from such supply the position of the vehicle. With the arrangement of the '503 patent, phase comparisons must be performed as they arise, and direction determinations calculated as they arise; requiring expensive and precise equipment operating in 'real time'.

BRIEF SUMMARY OF THE INVENTION

In accord with this invention, applicant provides two or more spaced antenna arrays each such array comprising a plurality of array elements and each adapted to produce a sequence of beams, which collectively sweep the region in which the vehicle transponders are to be located. The two arrays are preferably located relative to each other and to the region so that a meaningful sub region may generally be defined by the area common to two intersecting beams. More than two arrays may be used with a consequent increase in accuracy but with also an increase in complexity of calculation.

During the provision of such sequence of beams, successively switched on to cover the region, the amplitudes of transponder signals received are respectively converted to digital values. Such digital values may be compared to determine the strongest beam, which may be used (usually with a look-up table) to indicate the location of the transponder from the array.

However it will be noted that such comparison need not be performed in real time, thus the amplitude measurements may be made as they arise, converted to digital values and stored digitally for the later comparison and calculation.

For a beam sequence, the beam whose amplitude gives the largest digital value closely approximates the direction of the transponder from one array. The direction thus found is considered in combination with a direction similarly obtained from a beam of the other array so that the intersection of the directions gives the transponder position. In a refinement of this method, if two adjacent beams of a sequence give the largest digital values the directions may be simply averaged or given a weighted average to yield a more accurate direction than that given by the larger of the nearly equal beam values.

In a preferred variant of the means set out above, the phase differences between antenna elements of an array are controlled and switched by a Butler matrix which controls the relative phase angles between antenna elements of an array to obtain the sequence of beam direction and beam direction switching desired.

In drawings which illustrate a preferred embodiment of the invention:

BRIEF DESCRIPTION OF THE DRAWINGS

In FIG. 1 is shown a roadway with vehicular traffic travelling from lower left to upper right over two lanes between gantry uprights 12L and 12R. At each is an antenna array, 14L, 14R respectively. (See also FIG. 6). The first array has respective 8 beams: BL1–BL8, numbered counterclockwise about the upright 12L. The beam outlines shown are the projections of the three dimensioned beams on the two dimensioned roadway or more accurately, the horizontal plane including the transponder. The beams should collectively at least cover the 90° angle, measured counterclockwise from the left road edge to the line under the gantry. I prefer however to have the beams cover a small section outside of the road edge at the start of the sequence and a small section beyond the gantry at the end of the sequence. Hence the angular range for the sequence shown in FIG. 6.

The second array is a mirror image of the first about the lane divider LD with beams BR1 and BR8 numbered in a clockwise sense, about array 14R. With each array the sequence of switching the beams must be known but the order of the beams in the sequence is not of importance. The effects of vehicle travel between the duration of beams in a sequence are negligible because of the short duration of the beam sequence.

Figure 1:
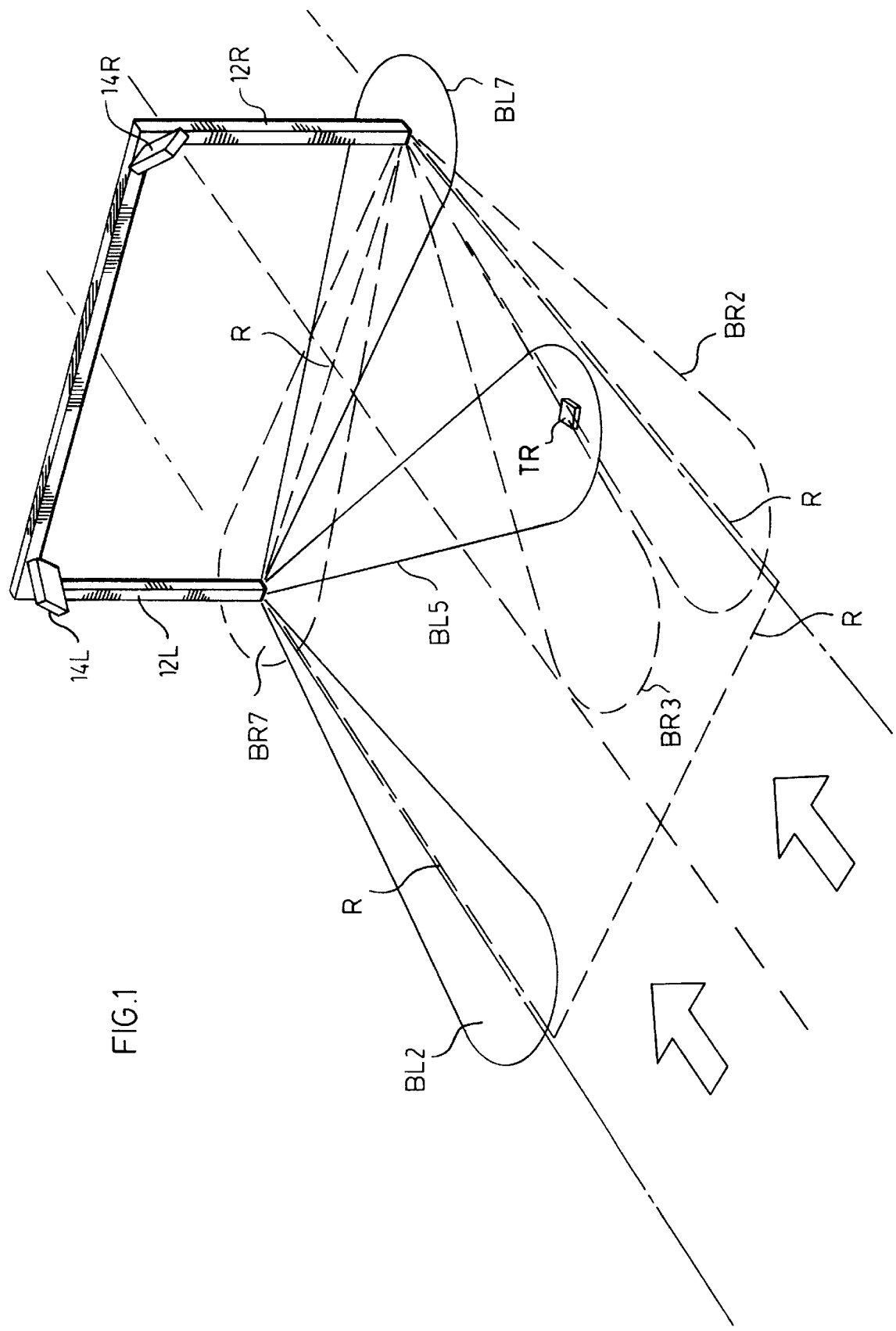
FIG. 1 is a perspective view of a gantry and antenna array, showing the shapes of beams projected on the roadway, or more accurately in the horizontal plane of the transponder.
Figure 6:
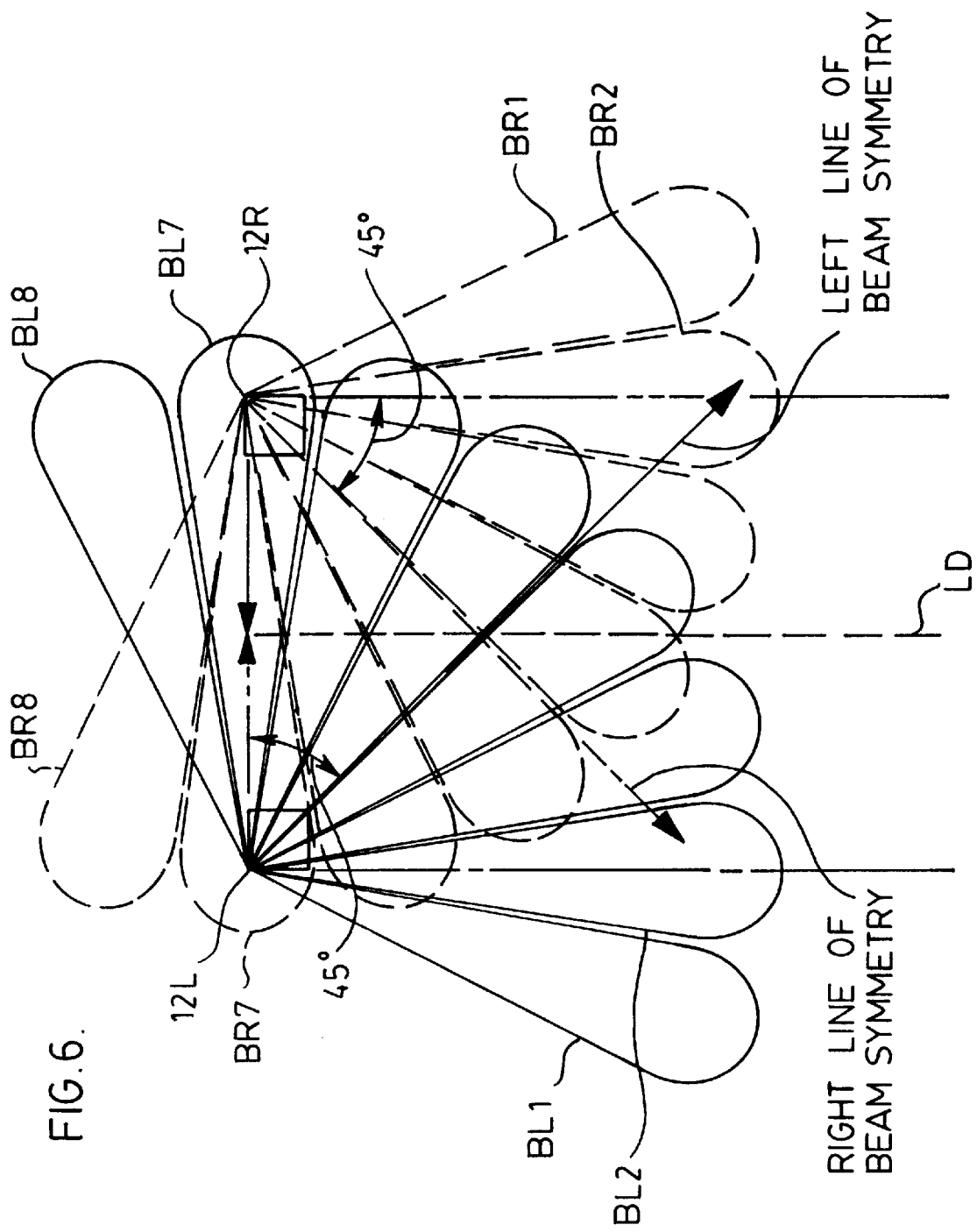
FIG. 6 is a plan view of the sequences.

Although gaps appear to exist between adjacent beams as shown in FIG. 1 and 6, it must be remembered that the lines approximately defining the beams mark the ½ strength or −3 dB lines. Thus the adjacent beams without discontinuity overlap each other.

Figure 2:
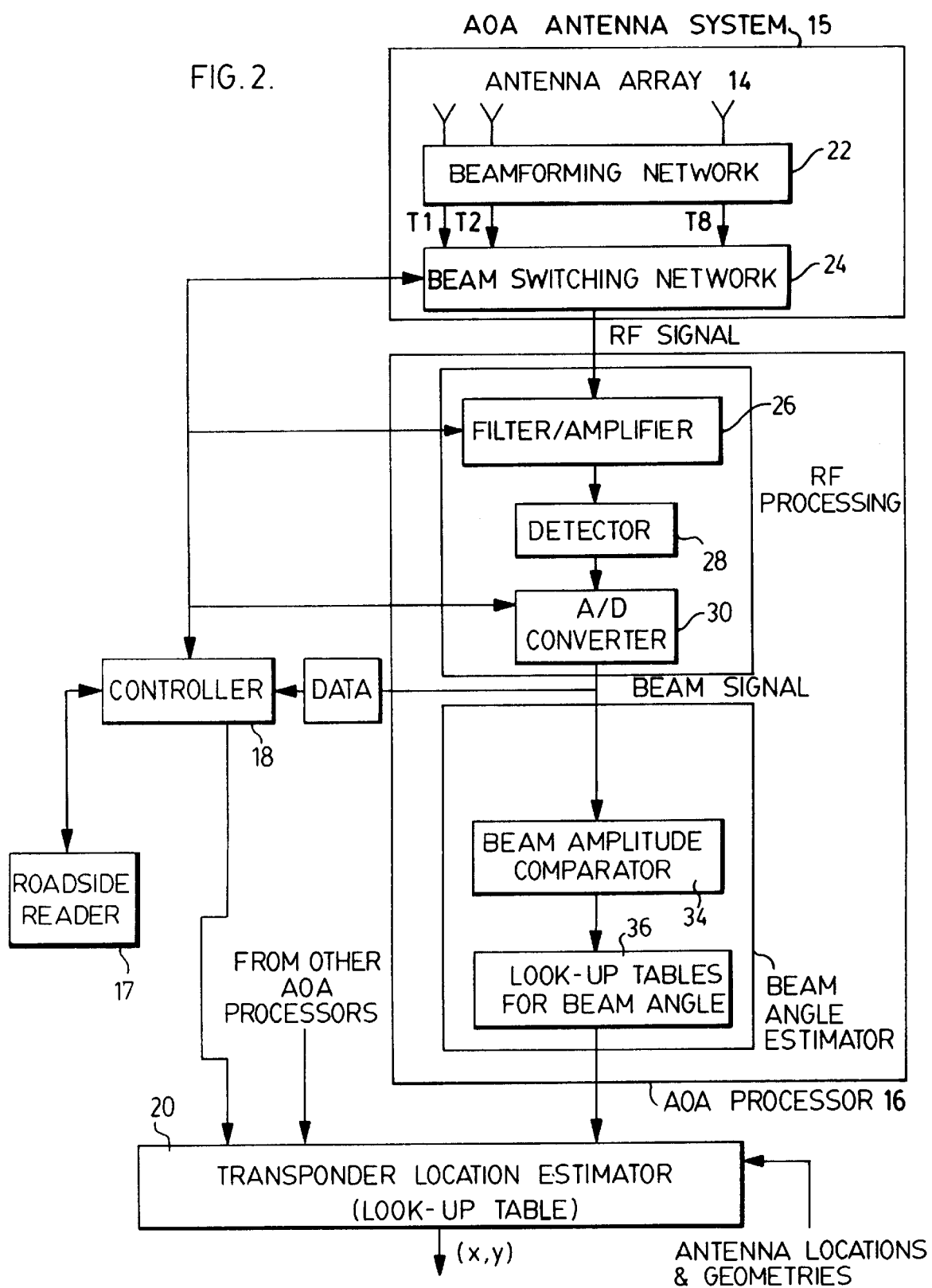
FIG. 2 is a schematic flow chart indicating the operation of the components.

FIG. 2 shows the logical arrangement of the transponder position location system including an AOA antenna system 15 including: an AOA processor 16, a controller 18 and a transponder location estimator 20.

However before discussing the logical arrangement of FIG. 2 please consider the array of the AOA antenna system. Each antenna array is a linear, multi-element, phased array antenna. Antenna elements are either patch or dipole with element spacing typically ½λ where λ is the antenna wavelength. The phase difference or electrical phase between antenna elements of a wavefront signal arriving at the antenna array is given by $$\phi = \frac{2\pi d}{\lambda}\sin\theta.$$

where λ is the wavelength of the transponder signal d is the antenna element spacing 0 is the azimuth beam direction relative to the line of symmetry.

As can be seen in Equation (1) a sequence of antenna beams can be stepped in different directions by varying the phase difference 0 between antenna elements. This can be done by changing element spacing but it is preferred to alter the phase difference between antenna elements as hereinafter described.

Figure 3:
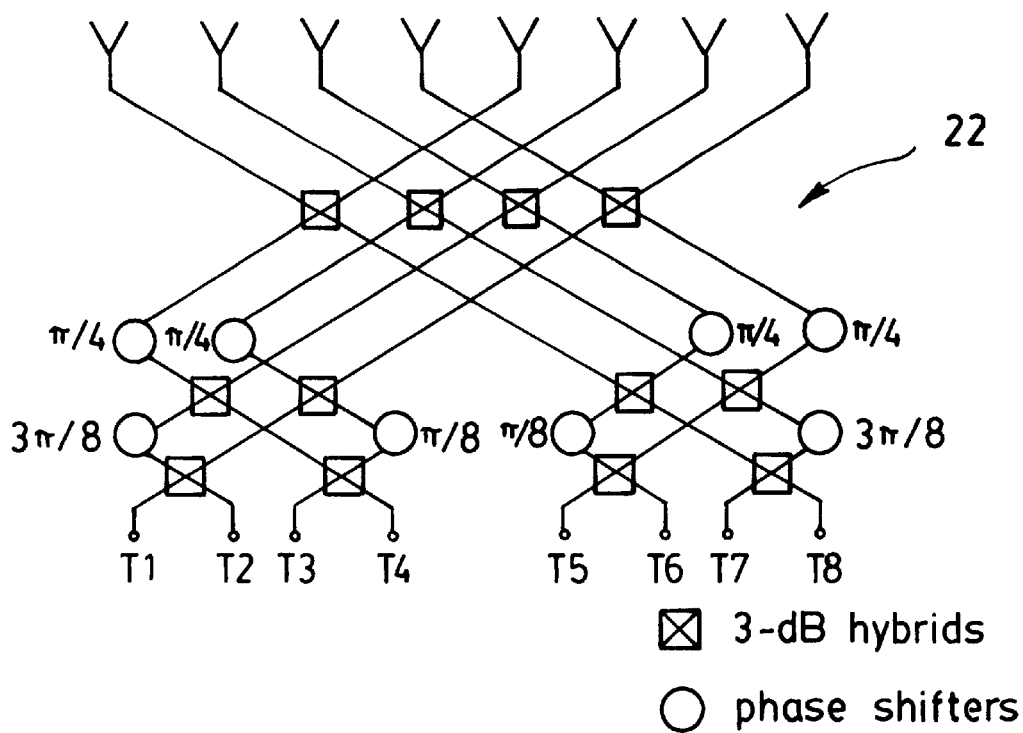
FIG. 3 is a schematic indication of a Butler matrix, FIG. 4 graphs beam pattern vs. beam angle, FIG. 5 indicates the time distribution of the beams during a transponder pulse.

For the Butler matrix of FIG. 3 the phase difference between the radiating elements with N elements (in the preferred embodiment N=8 and for the path beam is given by:

$$\theta = \frac{2\pi d}{\lambda}\sin\theta_n = \frac{21p1-1}{2N}2\pi.$$

Figure 4:
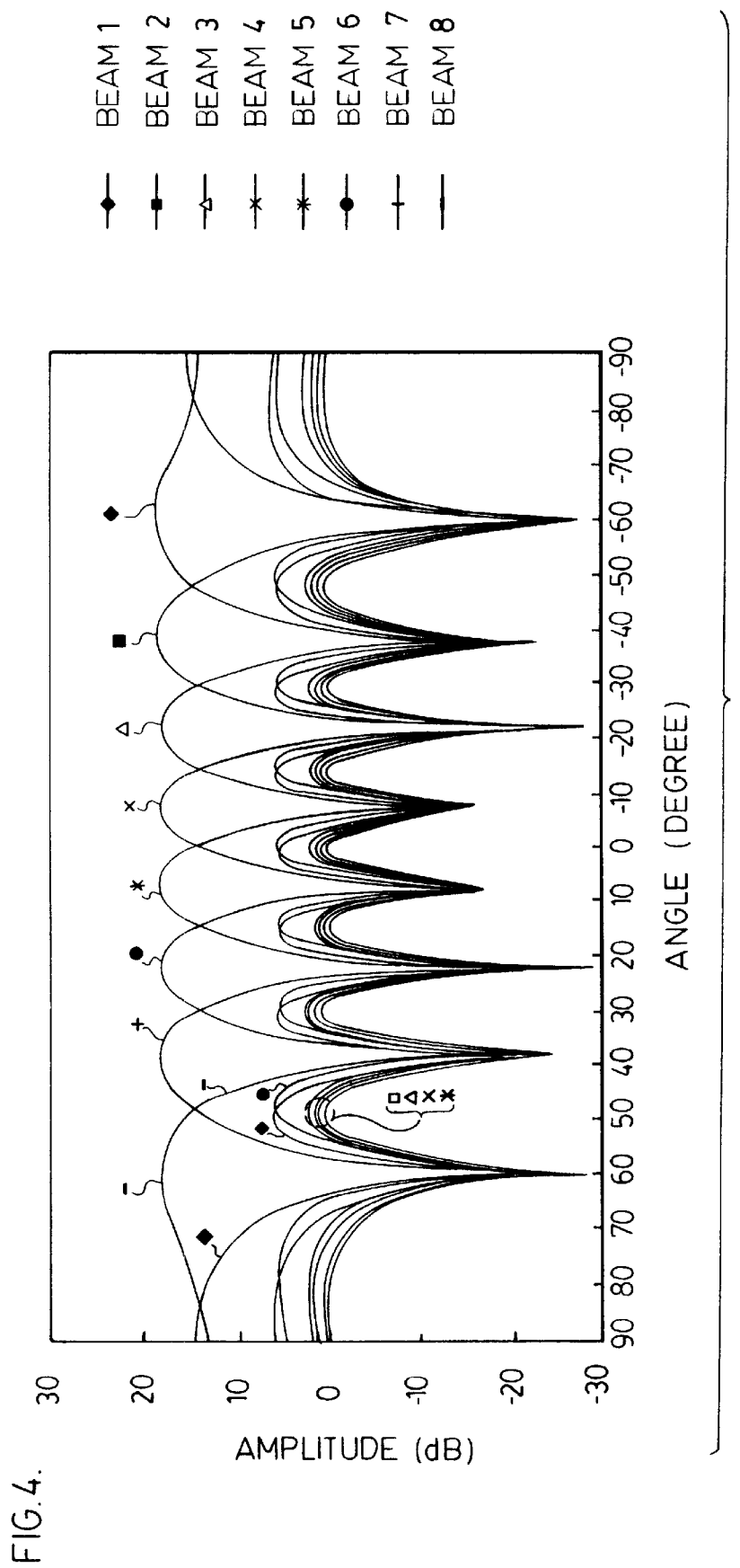

FIG. 4 shows that with an 8- element array (N=8), up to eight mutually orthogonal beams can be formed with antenna spacing d of ½(λ).

characteristic of the performance of a Butler matrix and in this case correspond to the operation of the Butler matrix in FIG. 3.

The computer print out of FIG. 4 superimposes the patterns of eight beams appearing, not simultaneously but sequentially. The eight beams over the azimuthal angular range, have one maximum and seven minima (in accord with the nature of the Butler matrix. Thus the minimum at +61.0° corresponds to the maximum for beam 8 and the minimum at 38.7° corresponds to the maximum at beam 7. Between these minima the two higher (of the lower loops) are for respectively adjacent beams 1 and 6 while, still lower are the loops of beams 2–5. However for a transponder in any beam (say beam 2) its amplitude for a transponder located, say at about −40° will give a digital value much higher than will be detected at −40° where the other seven beams are near their minima. Thus it is easy to select a threshold so that the equipment may quickly and readily select beam 2 as corresponding to the transponder location. Similarly, referring also to FIG. 1, a transponder close to the boundaries between beams BR2 and BR3, that is at about −50° on FIG. 4 would create digital values corresponding to the amplitudes of signals received during BR2 and BR3 that it is easy to also select the thresholds so that the digital values corresponding to BR2 and BR3 are above while, (at −50°) the digital values corresponding to the other beams, is below.

Chart 1 indicates the beam angles for use in FIGS. 1 and 6.

In FIG. 2 an AOA processor 16 connects to AOA ANTENNA SYSTEM 15. The array 14 of antenna elements (which may be 14R or 14L) is preferably composed of (here) eight elements at the preferred separation distance which will be ½λ, where λ is the wavelength of a transponder signal. The phase between the array elements is controlled by the beam forming network 22 which is preferably a Butler matrix shown in FIG. 3 and referred to hereafter. The

CHART 1

| | ARRAY LINE SYMMETRY | | | | | | | |
|---|---|---|---|---|---|---|---|---|
| N | 1 | 2 | 3 | 4 | 5 | 6 | 7 | 8 |
| ρ | −4 | −3 | −2 | −1 | 1 | 2 | 3 | 4 |
| φn | −157.5° | −112.5° | −67.5° | −22.5° | +22.5° | +67.5° | +112.5° | +157.5° |
| θn | −61.0° | −38.7° | −22.0° | −7.2° | +7.2° | +22.0° | +38.7° | +61.0° |

| MEASURED CLOCKWISE [ ↻ ]AT 12R RIGHT ROAD EDGE | | | | | | | | |
|---|---|---|---|---|---|---|---|---|
| BEAM | BR1 | BR2 | BR3 | BR4 | BR5 | BR6 | BR7 | BR8 |
| θ | −16.0° | 6.3° | 23° | 32.8° | 47.2° | 62.0° | 78.7° | 101.0° |

| MEASURED COUNTERCLOCKWISE [ ↺ ] AT 12L LEFT ROAD EDGE | | | | | | | | |
|---|---|---|---|---|---|---|---|---|
| BEAM | BL1 | BL2 | BL3 | BL4 | BL5 | BL6 | BL7 | BL8 |
| θ | −16.0° | 6.3° | 23° | 32.8° | 47.2° | 62.0° | 78.7° | 101.0° |

In FIG. 4 are superimposed the beam patterns for the eight beams of the array. As will be appreciated from the description and from FIG. 5 these beams do not coexist but occur sequentially. Thus it will be appreciated that during the existence of one beam all other beams are absent. FIG. 4 does show that the fact that the maximum for each beam corresponds to minima of all the other beams indicating the mutual orthography of the eight beams. All these matters are beam forming network 22 has connections T1–T8 to inputs to the BEAM SWITCHING NETWORK 24. The antenna beam signals T1–T8 are formed by the beam forming network utilizing the signals from the antenna elements. The antenna beam signals T1–T8 are sent to the beam switching network in which successive beam signals are selected and sent to AOA processor 16, for beam angle estimation.

The beam forming is preferably performed by the Butler matrix. At this time it is noted that the controller 18, controls the sequence of beams by signals to the beam switching network 24. The beam switching network, in turn, selects the antenna beams produced by the beam forming network to produce beams BL1–BL8 in sequence. (And in the other array, beams BR1–BR8 in sequence).

The beam forming network has outputs T1–T8 corresponding to inputs to the beam switching network 24. The RF signal therefrom is supplied to the filter amplifier 26 of the AOA processor. The output of the filter/amplifier 26 is detected (detection may include frequency downshifting) at detector 28 and provided to A/D convertor 30 so that a digital output corresponding to each beam amplitude is prepared. Thus the system being described, preferably will provide, for each array, the digital measure of the amplitudes in a sequence.

The sequence need not step through angularly adjacent beams but should follow the same sequence each time. For simplicity of description it will be assumed that each sequence of beams will step through angularly adjacent intervals, that is clockwise for the right array sequence, counterclockwise for the left array sequence.

The outputs of the A/D convertor are supplied to the beam amplitude comparator 32. If none of the beams in a sequence is over the threshold there is no vehicle in the region. If there are a number of vehicles in the region only one may transmit at a time in accord with the protocols customarily used. In practice the threshold can be selected so that for a single vehicle only one or two beams will provide digital values above the threshold. If two beams are above the threshold they will be adjacent, the vehicle transponder is near a point between a beam and its adjacent beam. (See for example the transition of the Transponder TR in FIG. 1). The two beam angular values may be averaged and the direction obtained which is the line to which the two beam axes are symmetrical. Alternatively as previously stated the simple averaging may be replaced by a weighted average or an interpolated result. (Alternatively the digital values of the two measurements may be used as weights to provide a different angle than that of the arithmetic mean of the angles). (It must be recalled that the sequence is repetitive and the vehicle position will show a track from which helpful information can be derived).

The results of the beam amplitude comparison are, when the threshold is exceeded, supplied to the look-up tables 36 and the result supplied to the transponder location estimator 20.

The direction from the one beam, or two beam look-up table is selected. It will logically define an angular range rather than a line.

The other antenna will similarly determine a direction defined as a range of angles.

As FIG. 2 shows the one or two beam determined directions will be supplied to the transponder location estimator 20 which will use a look-up table to determine a tetragon common to the beams from array L and R and the transponder may be considered in the centre of this tetragon with a margin of error determined by the size of the common area. The position may be used by the Transponder Location Estimator to determine the x/y coordinates of the common position. In the presence of interference such as multipath, or burst noise, beam estimates can be made based on prior estimated locations. Certain techniques such as least mean squares algorithm, can be used to enhance location estimation accuracy.

Moreover the data received from the A/D convertor is also supplied to the roadside station 17 which communicates in accord with a protocol, not here described, with the vehicle transponder. In such protocol the vehicle transponder identifies itself to the roadside station. Thus (by means not shown) but available to those skilled in the art, the protocol provides the identification of each transponder located by the transponder location estimator.

There are methods of beam forming and beam shifting alternative to that described. What is described is what is preferred.

There are several methods that can be used to form multiple beams in such sequences: 1) passive network such as the Butler matrix, 2) analog or digital phase shifters, or 3) digital beam forming. For passive beam forming networks, lumped elements and/or micro strip lines with directional or hybrid couplers are utilized to form the network. With the use of analog and digital phase shifters, individual antenna beams are formed and controlled using a voltage off-set or digital bits corresponding to the desired beam. In this case, the design is simple but bulky and expensive due to large size and high cost of the phase shifters.

Digital beam forming is possible with the use of a high-speed DSP processor. RF signals received at each antenna element are downshifted, typically to 12–15 MHZ for 500 kbps data-rate signals, filtered, amplified and digitized. Beam forming is carried out using a Fast Fourier Transform (FFT) technique. In this case, hardware implementation is complex and expensive since each channel is processed separately. Also timing and channel synchronization are critical. This further reduces system reliability and flexibility.

As compared among the beam forming techniques, the use of passive networks is simple, more reliable and cost effective. In particular, when the number of antenna elements is small, e.g. less than 16 as in the case of the transponder location processor.

Figure 5:
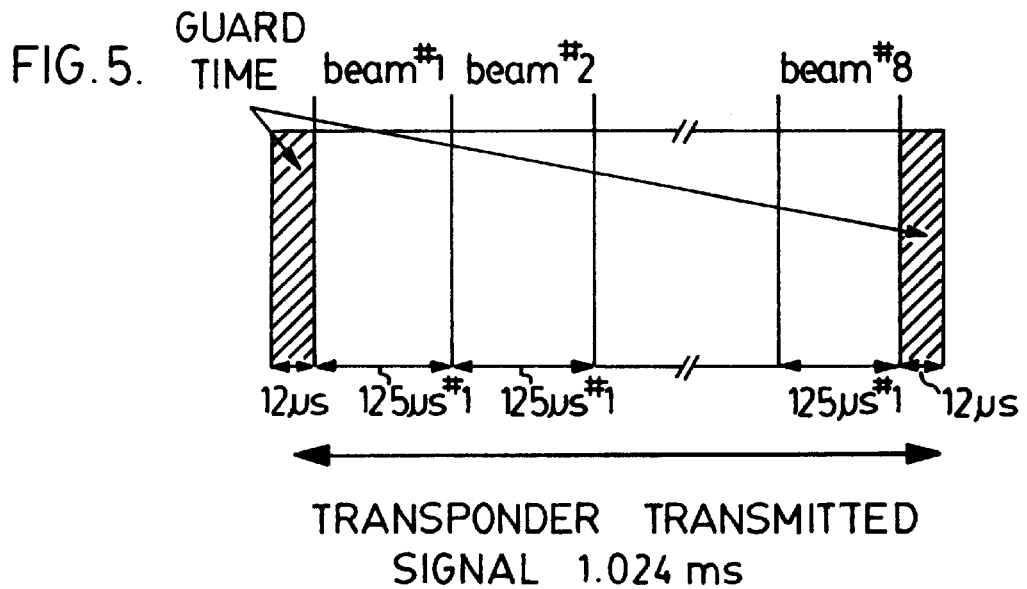

FIG. 5 shows the preferred timing use. Typically the transponder will be prepared to transmit 512 bits at 500 kb/s thus the length of the transmit pulse is 500 bits 500 kb/s 1.024 ms. FIG. 5 shows that during the 1.024 ms interval, 125 µs may be allotted to each of the eight beams, with a 12 µs guard interval at each end of the sequence.

In operation the two arrays L and R are operated. For each array, the beam sequences are filtered, amplified and converted to digital value. If for either array there is a single beam digital value over the threshold the value is supplied through Beam Amplitude Comparison 34 and the beam the angle is obtained from a look-up table. If there are two beams over the threshold these are averaged (or given a weighted average) at Beam Amplitude Comparison 34 and looked up in a look-up table to obtain the directional angle. The resultant angle will have a tolerance in terms of an angular range but this will be about half the angular range of a beam from a single beam look up table.

As FIG. 1 shows, the two 'beam-determined' directions will be supplied to the Transponder Location Estimator which may be another look-up table. The x/y location is determined by resort to the location look-up table and may be determined by the geometry of the gantries, their height and width. The margin of error in line width and transverse to the roadway may be calculated as may the resolution.

It will be noted from Chart 1, and FIGS. 6 and 1 that only six of the eight beams are required to sweep a 90 region R marked by chain dot. However I prefer to use eight beams because for several reasons it is useful to know if the transponder in question is just outside the main region R of interest.

SOME PARAMETERS

Although two arrays are shown, three or more could be used as there are easy mathematical methods including triangulation and the like for obtaining positions from three or more intersecting beams.

The region swept will not always be a rectangle but may, for example a region formed over the merger area of two lanes.

The beams should overlap at or near the −3 dB lines but more or less than eight beams may be selected.

The Butler matrix may be varied to produce more or less than eight beams. It is believed that the Butler matrix tends to become unwieldy and expensive if more than 16 beams are used.

The process need not use all the beams available with the beam former and switcher used. For example the preferred process described herein could be run with the Butler matrix shown but only employing beams 2 to 7.

The beam sequence must be run during a transponder transmission pulse.

The spacing of antenna elements may be varied which will give a beam varied direction for a given phase angle between elements.

It is obvious that irregularly spaced or located array elements can be used to produce the desired beams if the phases between array elements are correspondingly selected. However it is difficult to visualize the situation where the complexity required would be warranted.

We claim:

1. Means for locating the position of a transponder on a roadway, comprising:
    a first array of antenna elements at a first location adjacent the roadway,
    first beam switching control for causing said first array to continually and repetitively step through a first sequence of first beams collectively covering an area of said roadway,
    means for detecting the respective amplitudes of received first signals corresponding to said first beams,
    means for converting such amplitudes to first digital values,
    means for determining from said first digital values a first azimuthal range of directions of said transponder from said first location,
    a second array at a second location adjacent said area and spaced from said first location,
    second beam switching control for causing said second array to continually and repetitively step through a second sequence of second beams over a common part of said area where they respectively intersect with said first beams,
    means for detecting the respective amplitudes corresponding to said second beams,
    means for repetitively converting said amplitudes to second digital values,
    means for repetitively determining from said second digital values a second range of directions of said transponder from said second location,
    thereby repetitively calculating intersections between said first and second range of directions indicative of the then location of said transponder.

2. The means as claimed in claim 1 wherein said transponder emits a pulse of predetermined duration, wherein each said beam switching control creates said sequence of beams during said duration.

3. Means for location of a transponder, including first and second arrays of antenna elements at spaced locations,
    means for causing each of said arrays to sequentially switch through a sequence of beams to sweep a common area, to intersect beams from the other array,
    means for converting the amplitudes signals respectively received during said respective beams to digital values,
    means for determining from said digital values the location of a transponder in said common area.

4. Means as claimed in claim 1 where said beam switching controls each include a Butler matrix.

5. Means as claimed in claim 2 where said beam switching controls each include a Butler matrix.

6. Means as claimed in claim 3 wherein said means for causing uses a Butler matrix for each of said arrays.

7. Means as claimed in claim 1 including a first threshold device for determining the relation of said first digital values to a first threshold and including a second threshold device for determining the relation of said second digital values to a second threshold, said threshold values respectively determining whether there is a transponder in said common part of said area which caused the digital values.

8. Means as claimed in claim 2 including a first threshold device for determining the relation of said first digital values to first threshold and including a second threshold device for determining the relation of said second digital values to a second threshold.

9. Means as claimed in claim 2, including a threshold device for determining from respectively each of the first and second digital values, those indicative of the direction of a transponder, and determining therefrom the location of the last mentioned transponder.

10. Means as claimed in claim 3, including a threshold device for determining from respectively each of the first and second digital values, those indicative of the direction of a transponder, and determining therefrom the location of the last mentioned transponder.

11. Means as claimed in claim 4, including a threshold device for determining from respectively each of the first and second digital values, those indicative of the direction of a transponder.

12. Means as claimed in claim 5, including a threshold device for determining from respectively each of the first and second digital values, those indicative of the direction of a transponder.

13. Means as claimed in claim 6, including a threshold device for determining from respectively each of the first and second digital values, those indicative of the direction of a transponder.

14. Method of locating a transponder in a common area of a roadway comprising:
    continually sweeping such common area with a first sequence of separate beams from a first array,
    continually sweeping such common area with a second sequence of separate beams from a second array,
    converting signals corresponding to said first sequence into first digital values,
    converting signals corresponding to said second sequence into second digital values,
    determining any first digital value indicative of a transponder in a beam,
    determining any second digital value indicative of a transponder in a beam,
    responsive to finding a first and second digital value indicative of a transponder, giving the approximate location of said last mentioned transponder.

15. Method as claimed in claim 14 including determining from said first digital values a first corresponding direction and from said second digital value a second corresponding direction and from said directions said transponder location.

16. Method as claimed in claim 14 for use with a transponder emitting a pulse train over a predetermined interval, and completing each of said sweeping steps during said intervals.

17. Method as claimed in claim 15 for use with a transponder emitting a pulse train over a predetermined interval.

18. Means as claimed in claim 1 wherein said transponder will emit a pulse train of predetermined duration, and said first and second arrays are stepped through at least one first sequence and at least one second sequence, during said duration.

19. Means as claimed in claim 2 wherein such transponder will emit a pulse train of predetermined duration, and said first and second arrays are stepped through at least one first sequence and at least one said second sequence, during said duration.

20. Means as claimed in claim 3 wherein such transponder will emit a pulse train of predetermined duration, and said first and second arrays are stepped through at least one first sequence and at least one second sequence, during said duration.

21. Means as claimed in claim 4 wherein such transponder will emit a pulse train of predetermined duration, and said first and second arrays are stepped during said duration.

22. Means as claimed in claim 5 wherein such transponder will emit a pulse train of predetermined duration, and said first and second arrays are stepped during said duration.

23. Means as claimed in claim 6 wherein such transponder will emit a pulse train of predetermined duration, and said first and second arrays are stepped during said duration.

24. Means as claimed in claim 7 wherein such transponder will emit a pulse train of predetermined duration, and said first and second arrays are stepped during said duration.

25. Means as claimed in claim 8 wherein such transponder will emit a pulse train of predetermined duration, and said first and second arrays are stepped during said duration.

26. Means as claimed in claim 9 wherein such transponder will emit a pulse train of predetermined duration, and said first and second arrays are stepped during said duration.

27. Means as claimed in claim 3 wherein said means for causing, means for converting and means for determining operate continually and repetitively.

28. Means as claimed in claim 3 for determining which of said first and which of said second digital values are above a predetermined threshold and in each case using the values above said threshold for determining most probable direction from said first and second arrays.

* * * * *